(No Model.) 2 Sheets—Sheet 1.

W. C. PARSONS.
HYDROMETRIC CONVEYER.

No. 335,236. Patented Feb. 2, 1886.

Witnesses: Inventor:
William C. Parsons,
by C. P. Humphry
Atty.

(No Model.)

W. C. PARSONS.
HYDROMETRIC CONVEYER.

No. 335,236. Patented Feb. 2, 1886.

Witnesses:
Dayton W. Doyle
E. W. Stuart

Inventor:
William C. Parsons,
by C. P. Humphrey
Atty.

UNITED STATES PATENT OFFICE.

WILLIAM C. PARSONS, OF AKRON, OHIO.

HYDROMETRIC CONVEYER.

SPECIFICATION forming part of Letters Patent No. 335,236, dated February 2, 1886.

Application filed February 15, 1884. Serial No. 120,836. (No model.)

*To all whom it may concern:*

Be it known that I, WILLIAM C. PARSONS, a citizen of the United States, residing at the city of Akron, in the county of Summit and State of Ohio, have invented a new and useful Improvement in Hydrometric Conveyers, of which the following is a specification.

My invention has relation to devices for conveying fluids to or from a receptacle containing a fluid of varying density—as evaporating-pans for sirups, receivers of distilling apparatus, &c.

The object of my invention is to provide a device which, actuated by the variation in the density of the fluid contained in the receptacle with which it is connected, shall, whenever that density shall have reached any desired degree, either permit the escape of the fluid itself or allow the entrance thereto of another fluid.

It consists, generally, in a pipe or duct opening into or from the receptacle containing said fluid, provided with a valve which shall, when open, permit the escape of the fluid from the receptacle or the entrance of another fluid into it, and a float which shall sink and remain submerged in the variable fluid until it shall have reached a certain degree of density, and shall rise and float after that degree is reached, and by its motion open or close the valve.

Figures 1, 2:
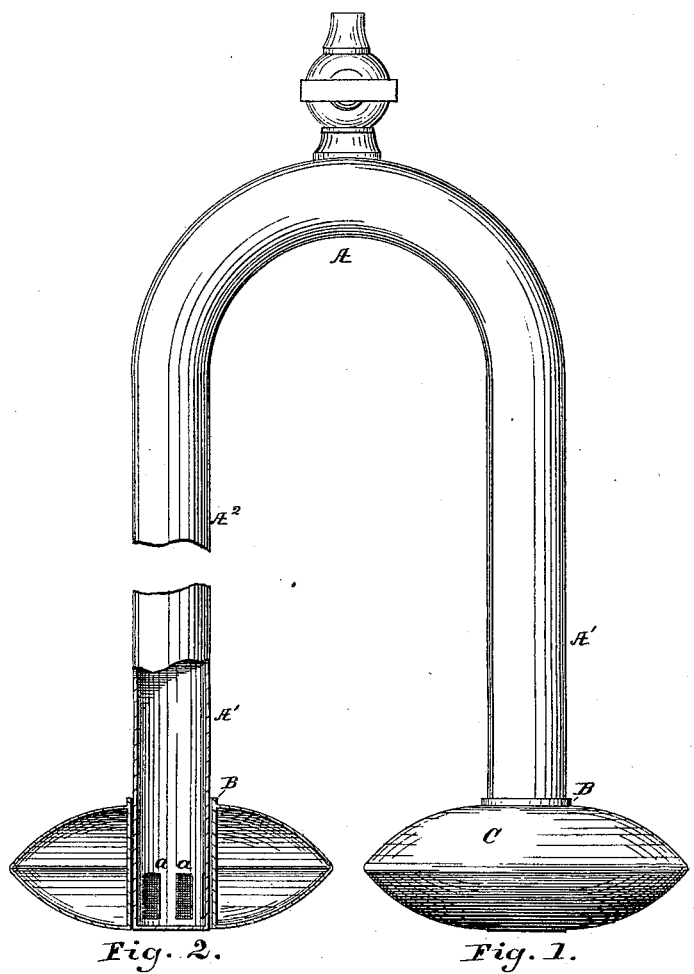
Figure 3:
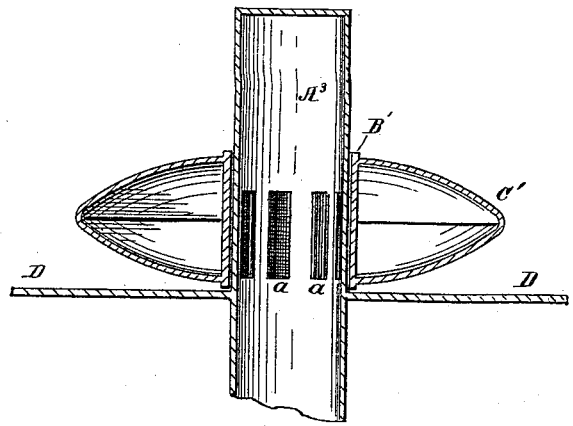

My invention is illustrated in the accompanying drawings, in which Figure 1 is an elevation of a siphon of the kind ordinarily used for conveying sirups to or from evaporating-pans, one arm of which is provided with my invention; Fig. 2, a vertical central section of the valve-arm of Fig. 1; Fig. 3, a vertical central section of a pipe, valve, and float leading downward from the receptacle; and Fig. 4, a modified form of valve and float with a pipe leading upward from the receptacle.

Referring to Figs. 1 and 2, A is a short siphon having the arms A' A'', the latter broken off to leave space to show Fig. 2. The end of arm A' is closed, but near the bottom has a series of lateral orifices, $a$ $a$. Surrounding the arm A' is a sleeve, B, free to slide thereon, and when surrounding the orifices $a$ $a$ closes them. Connected and moving with the sleeve B is a float, C. The size of this float will depend upon the buoyancy desired.

In operation the siphon is charged and placed between an evaporating-pan and another receptacle, with the float and valve in the former. Until the fluid reaches the density for which the float is adapted the latter will remain submerged and close the orifices $a$ $a$; but when that density is reached it will rise, open these orifices, and permit either the escape of the fluid or the entrance thereto of other lighter fluids.

In Fig. 3, A$^3$ is the pipe, B' the collar, and C' the float, the construction and arrangement being the same as in Figs. 1 and 2, excepting that the pipe opens downward from the bottom D of the receptacle.

Figure 4:
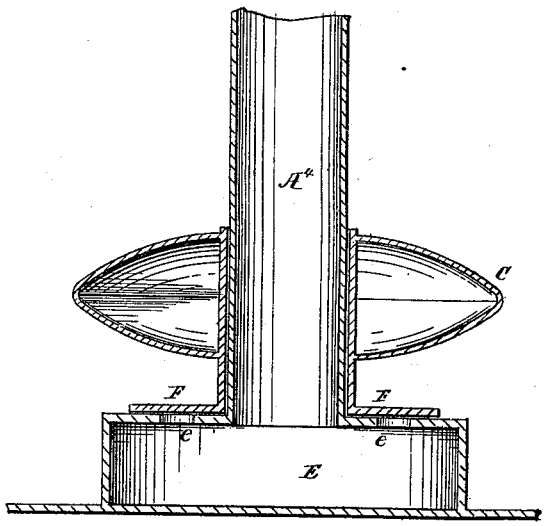

In Fig. 4, the pipe A$^4$, leading upward, is enlarged into a box, E, at the base, through the top of which is a series of orifices, $e$ $e$. An annular disk, F, connected with the float C'', rests upon and closes these orifices until raised by the float.

I am aware that a valve actuated by a float which constantly rests upon and follows the surface of a fluid is not new; but such is not my invention.

What I claim being—

In combination with a siphon and a valve to close one arm thereof, a float connected with said valve and of a specific gravity to float in a fluid of a certain density and sink if the density varies or becomes less, substantially as and for the purpose set forth.

In testimony that I claim the foregoing I have hereunto set my hand this 12th day of February, A. D. 1884.

WILLIAM C. PARSONS.

Witnesses:
C. P. HUMPHREY,
E. W. STUART.